(12) United States Patent
Xiao et al.

(10) Patent No.: US 10,692,139 B2
(45) Date of Patent: Jun. 23, 2020

(54) SYSTEM, METHOD, AND NON-TRANSITORY COMPUTER-READABLE STORAGE MEDIA FOR APPLYING FOR A CREDIT CARD

(71) Applicant: Wal-Mart Stores, Inc., Bentonville, AR (US)

(72) Inventors: Fei Xiao, San Jose, CA (US); David Bash, San Francisco, CA (US); Yannis Pavlidis, Boulder, CO (US)

(73) Assignee: WALMART APOLLO, LLC, Bentonville, AR (US)

( * ) Notice: Subject to any disclaimer, the term of this patent is extended or adjusted under 35 U.S.C. 154(b) by 829 days.

(21) Appl. No.: 14/610,776

(22) Filed: Jan. 30, 2015

(65) Prior Publication Data

US 2016/0225074 A1  Aug. 4, 2016

(51) Int. Cl.
G06Q 40/00 (2012.01)
G06Q 40/02 (2012.01)

(52) U.S. Cl.
CPC .................. *G06Q 40/025* (2013.01)

(58) Field of Classification Search
CPC ......... G06Q 30/02; G06Q 30/06; G06F 15/18
See application file for complete search history.

(56) References Cited

U.S. PATENT DOCUMENTS

| | | | | |
|---|---|---|---|---|
| 6,542,912 B2 * | 4/2003 | Meltzer | .................. | G06Q 10/06 705/24 |
| 7,401,731 B1 * | 7/2008 | Pletz | ..................... | G06Q 20/24 235/375 |
| 7,610,257 B1 * | 10/2009 | Abrahams | ............... | G06Q 20/10 705/38 |
| 7,912,770 B2 | 3/2011 | Haggerty et al. | | |
| 8,190,804 B1 * | 5/2012 | Srinivasan | .......... | G06F 13/1615 710/240 |
| 2006/0248011 A1 * | 11/2006 | Hecht-Nielsen | ....... | G06Q 20/02 705/44 |
| 2008/0215470 A1 * | 9/2008 | Sengupta | ............... | G06Q 40/02 705/35 |
| 2008/0243569 A1 | 10/2008 | Hadden | | |
| 2008/0281726 A1 * | 11/2008 | Gupta | ................. | G06Q 30/0601 705/26.1 |
| 2009/0083069 A1 * | 3/2009 | Tierney | .................. | G06F 19/328 705/2 |
| 2009/0106178 A1 * | 4/2009 | Chu | ...................... | G06N 99/005 706/14 |
| 2012/0296806 A1 * | 11/2012 | Abrahams | ............... | G06Q 40/08 705/38 |
| 2013/0166436 A1 | 6/2013 | Eze | | |
| 2013/0346201 A1 * | 12/2013 | Bilange | .............. | G06Q 30/0256 705/14.54 |

(Continued)

*Primary Examiner* — Kirsten S Apple
*Assistant Examiner* — Martin A Gottschalk
(74) *Attorney, Agent, or Firm* — Bryan Cave Leighton Paisner LLP

(57) ABSTRACT

In different embodiments of the present invention, systems, methods, and computer-readable storage media related to an application for a credit card for a target customer. A credit card application is prepared based on information associated with the target customer. If the credit card application is denied, then either (1) a request for reconsideration or (2) an override is prepared based on an established purchasing power indicator associated with the customer.

20 Claims, 5 Drawing Sheets

(56) References Cited

U.S. PATENT DOCUMENTS

| | | | |
|---|---|---|---|
| 2014/0006165 A1* | 1/2014 | Grigg | G06Q 30/0207 |
| | | | 705/14.64 |
| 2014/0006255 A1 | 1/2014 | Haggerty et al. | |
| 2014/0344069 A1 | 11/2014 | Haggerty et al. | |
| 2015/0112817 A1* | 4/2015 | Hamilton | G06Q 30/0277 |
| | | | 705/14.73 |
| 2015/0193830 A1* | 7/2015 | Zucker | G06Q 30/02 |
| | | | 705/14.53 |

* cited by examiner

SYSTEM, METHOD, AND NON-TRANSITORY COMPUTER-READABLE STORAGE MEDIA FOR APPLYING FOR A CREDIT CARD

FIELD OF THE DISCLOSURE

The present invention relates to the development of customers of a retail (online and/or brick and mortar) store, and more particularly, to systems, methods, and computer-readable storage media that may be used to file an application for a credit card for a target customer.

BACKGROUND

A customer or consumer's credit score, i.e., the FICO credit score, is a number representing the creditworthiness of a person, i.e., the likelihood that person will pay his or her debts and may be used, inter alia, in determining the consumer's qualification for a loan or credit card.

In some instances, a consumer may apply for a credit card at a retail store. Generally, the credit card is issued by a third party bank. The consumer may fill out a credit card application that may include information to identify the consumer, e.g., name, address, and social security number, as well as bank account information and/or employment and income information. The credit information may be transmitted to the $3^{rd}$ party bank. Based on the application, the bank may request the consumer's credit score from a credit-reporting agency. Based on the consumer's credit score, the bank may decide to issue or deny the credit card. If the bank decides to issue the credit card, the credit score may be further used to establish the limit on the credit card.

However, for one or more reasons, a customer of an online or brick and mortar retail store may not have an established credit history from which a traditional credit score may be available or determined. Thus, if the customer were to desire to, and apply for a credit card, at the retail store, the credit card application may be denied. It is sometimes desirable to the retail store that the customer be issued a credit card, to retain the customer, to allow the customer to make purchases at the retail store and/or build customer loyalty.

The present invention is aimed at one or more of the problems identified above.

SUMMARY OF THE INVENTION

In different embodiments of the present invention, systems, methods, and computer-readable storage media may be used to apply for a credit card for a targeted customer.

In one embodiment of the present invention, a system for applying for a credit card for a target customer is provided. The system may include a memory unit, a credit estimation unit and a credit card application unit. The memory unit is configured to store purchasing data associated with the target customer. The purchasing data may include the target customer's purchasing transactions with a retailer and may be stored in an associated customer account. The credit estimation unit is coupled to the memory unit and is configured to establish an estimate of a credit worthiness of the target customer as a function of the target customer's purchasing transactions with the retailer stored in the memory unit. The credit card application unit is coupled to the memory unit and the purchasing power unit and is configured to receive information associated with the target customer and to transmit a credit card application to a bank computer system as a function of the information associated with the target customer. The credit card application unit is configured to receive a decision from the bank computer system. If the decision from the bank computer is a denial of the credit card application, the credit card application unit is further configured to send one of (1) an request for consideration of the credit card application as a function of the purchasing power indicator associated with the target customer and (2) an override of the denial of the credit card application.

In another embodiment of the present invention, a method for applying for a credit card for a target customer is provided. The method includes the step of storing, in a memory unit, purchasing data associated with the target customer. The purchasing data includes the target customer's purchasing transactions with a retailer. The purchasing data for the target customer may be stored in an associated customer account. The method also includes the steps of establishing an estimate of a credit worthiness of the target customer as a function of the target customer's purchasing transactions with the retailer stored in the memory unit, receiving information associated with the target customer, and transmitting, a credit card application to a bank computer system as a function of the information associated with the target customer. The method further includes the steps of receiving, a decision from the bank computer system and, if the decision from the bank computer is a denial of the credit card application, sending one of (1) an request for consideration of the credit card application as a function of the purchasing power indicator associated with the target customer and (2) an override of the denial of the credit card application.

In still another embodiment of the present invention, one or more non-transitory computer-readable storage media, having computer-executable instructions embodied thereon, wherein when executed by at least one processor, the computer-executable instructions cause the processor to operate a memory unit, a credit estimation unit and a credit card application unit. The memory unit is configured to store purchasing data associated with the target customer. The purchasing data may include the target customer's purchasing transactions with a retailer and may be stored in an associated customer account. The credit estimation unit is coupled to the memory unit and is configured to establish an estimate of a credit worthiness of the target customer as a function of the target customer's purchasing transactions with the retailer stored in the memory unit. The credit card application unit is coupled to the memory unit and the purchasing power unit and is configured to receive information associated with the target customer and to transmit a credit card application to a bank computer system as a function of the information associated with the target customer. The credit card application unit is configured to receive a decision from the bank computer system. If the decision from the bank computer is a denial of the credit card application, the credit card application unit is further configured to send one of (1) an request for consideration of the credit card application as a function of the purchasing power indicator associated with the target customer and (2) an override of the denial of the credit card application.

BRIEF DESCRIPTION OF THE FIGURES

Other advantages of the present disclosure will be readily appreciated, as the same becomes better understood by reference to the following detailed description when considered in connection with the accompanying drawings wherein.

Non-limiting and non-exhaustive embodiments of the present invention are described with reference to the following figures, wherein like reference numerals refer to like parts throughout the various views unless otherwise specified.

Figure 1:
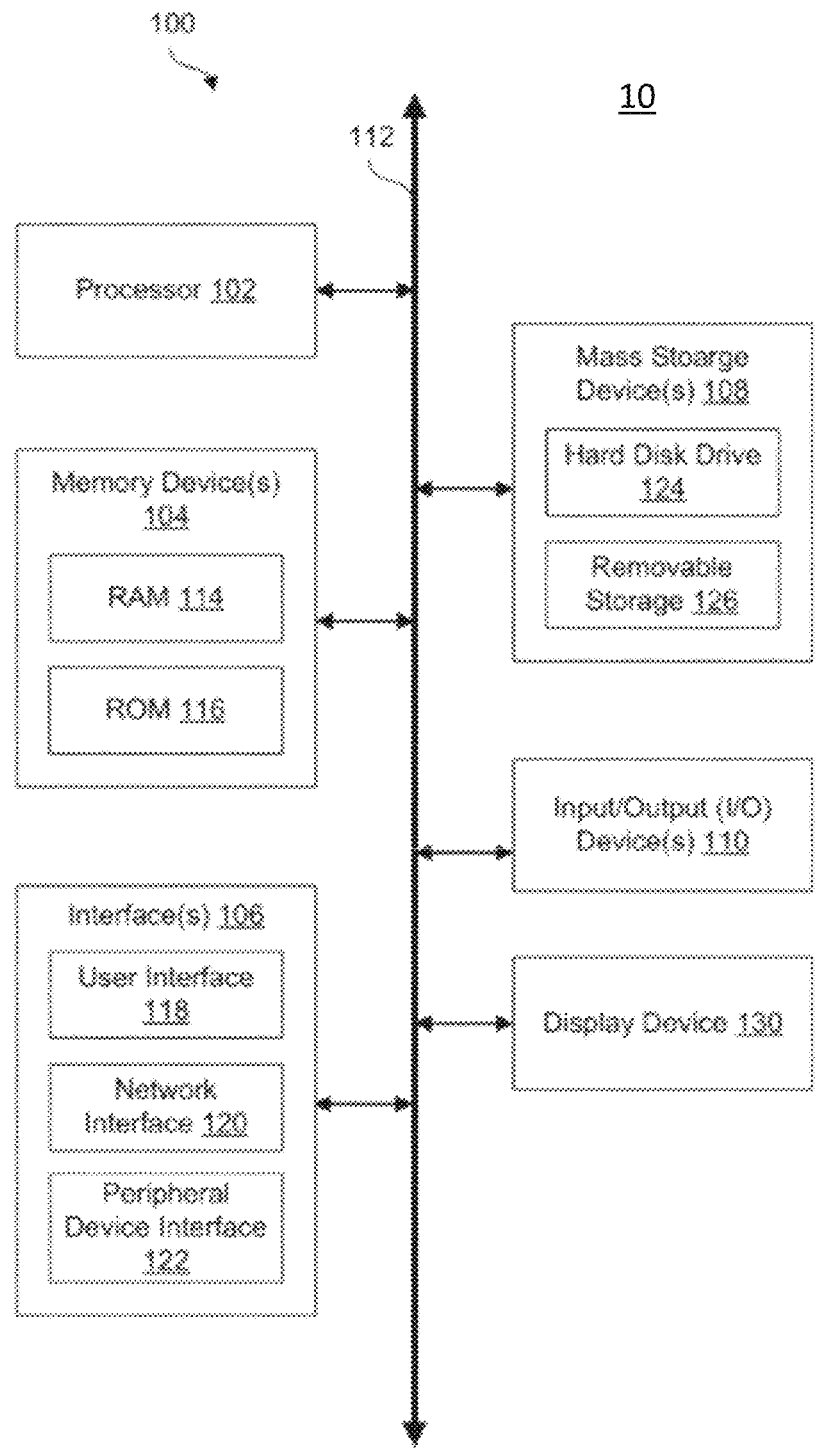
FIG. 1 is a schematic illustrating various aspects of a system, according to the present disclosure.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "unit", "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes a system, method, and computer program product that may be used to establish a predicted credit score for a customer of a retail online or brick and mortar store (or consumer). In general, the predicted credit score may then be used for a variety of purposes, including but not limited to:

qualify the customer for a credit card or other financial product;

overrule a denial of a credit card or other financial product;

qualify the customer for purchasing finance, i.e., a cash loan;

determine customer qualification for a financial promotion (e.g., 6 or 12 month interest free financing or cash back promotion);

determine an annual percentage rate for a credit card or other financial product; and, determine a credit limit for a credit card or other financial product.

The disclosure also relates to a system, method, and computer program product that may be used to apply for a credit card for a target customer.

With reference to the FIGS. and in operation, the present invention provides a system 10, methods and computer product media that has stored thereon a computer program, that established a predicted credit score. The predicted credit score may be used in replace of, or in conjunction with, a FICO credit score. For example, the predicted credit score may be used for a customer that does not have a recorded credit history or has a low FICO score, but nonetheless, based on the purchasing transactions with the retail store, may qualify for a credit card, other financial product or promotion. For instance, a customer may have established a purchasing transaction history at the retail store using cash and/or a debit card. Cash transactions could be tracked, e.g., through a customer loyalty card associated with a customer loyalty program. It should also be noted that other purchasing transactions at the retail store may be included in the purchasing transactions utilized by the present invention. For instance, purchasing transactions at related or associated companies or retail stores may be included. Furthermore, purchasing transactions at other retail environments may be included if available. For instance, purchasing transactions at other retail stores may be included if a common nexus exists, such as a common or related loyalty program and/or a common payment method, e.g., an eWallet or other electronic form of payment.

FIG. 1 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
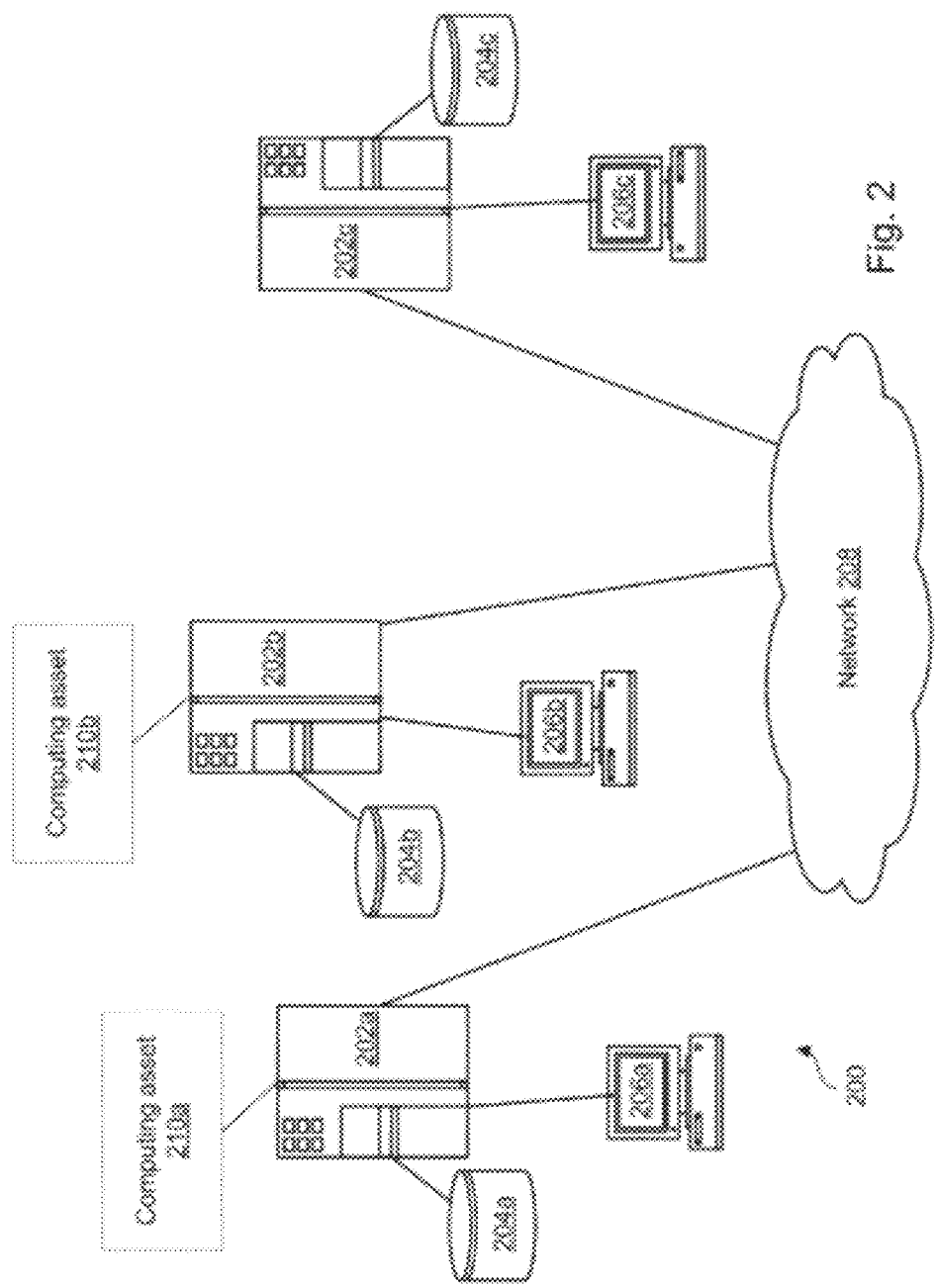
FIG. 2 is a schematic illustrating example components of computer network, according to an embodiment of the present invention.

FIG. 2 illustrates a networked environment 200 in which methods described herein may be used. The environment 200 may include a plurality of computer servers 202a-202c. The servers 202a-202c may be geographically separated, such as in different cities, countries, or continents. The methods disclosed herein may also advantageously be used with computer servers 202a-202c that are located within the same facility. The computer servers 202a-202c may be operably coupled to one or more databases 204a-204c for storing operational and/or executable data. A user wishing to access data and functionality of the computer servers 202a-202c and databases 204a-204c may do so by means of terminals 206a-206c operably coupled thereto. The computer servers 202a-202c and/or terminals 206a-206c may have some or all of the attributes of the computing device 100 of FIG. 1. The terminals 206a-206c may be a workstation, tablet computer, smart phone, or any other computing device. The servers 202a-202c may be operably connected to one another by a network 208. The network 208 may include a local area network (LAN), wide area network (WAN), the Internet, or a combination of any of these.

The servers 202a-202b may be used to manage and/or monitor activity at one or more computing assets 210a-210b. The computing assets 210a-210b may include a number of servers, workstations, tablet computers, smart phones, and the like. The computing assets 210a-210b may also include electronically controlled physical systems, i.e., door locks, climate control systems, alarm systems, and the like. The physical systems of the computing assets 210a-210b may also be controlled and/or monitored by a server, such as a server 202a-202c.

A server 202c may operate as a global server 202c operable to monitor and report on security data gathered from the servers 202a-202b, operating as asset server 202a-202b, and the corresponding computing assets 210a-210b. Alternatively, the global server 202c may communicate directly with computing resources of the computing assets 210a-210b such that asset servers 202a-202b may be omitted or bypassed.

Figure 3:
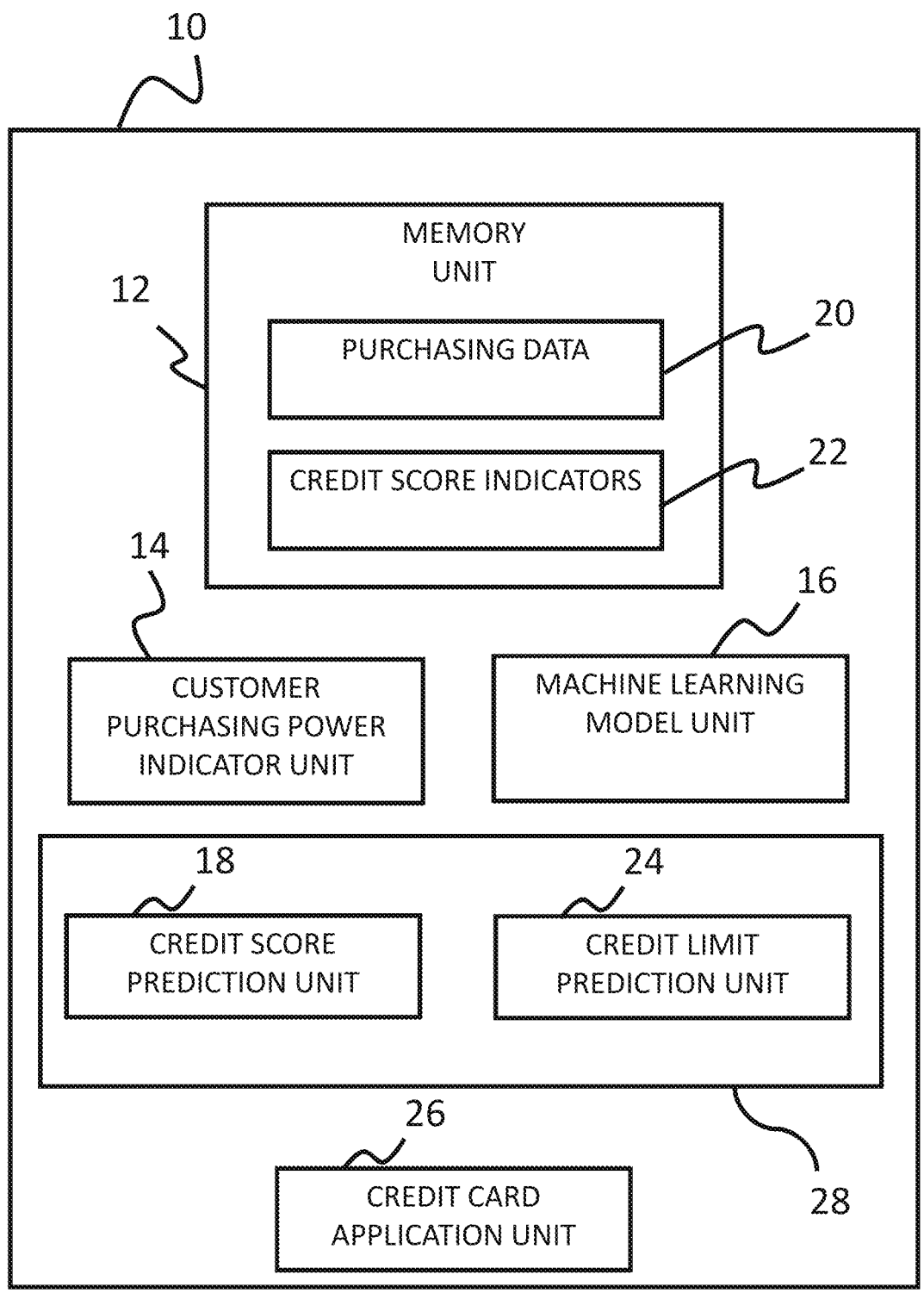
FIG. 3 is a functional schematic of the present invention, according to an embodiment of the present invention.

With reference to FIG. 3, the system 10 includes a memory unit 12, a customer purchasing power indicator unit 14, a machine learning module unit 16, and a credit score predicting unit 18.

In one embodiment, the memory unit 12 may be configured to store purchasing data 20 associated with the target customer. The target customer is the customer for which a predicted credit score may be sought. In general, the purchasing data 20 associated with the target customer includes the target customer's purchasing transactions with a retailer or retail store. In one aspect of the present invention, the retail store may include one or more brick and mortar stores and an online store. The purchasing data 20 may include the aggregated purchase data across all brick and mortar stores and the online store associated with the target customer. The purchasing data 20 for the target customer may be stored in an associated customer account in the memory unit 12.

The customer purchasing power indicator unit 14 is coupled to the memory unit 12 and is configured to establish an indicator of the purchasing power of the target customer ($X_{tc}$) as a function of the purchasing data in the associated customer account. The customer purchasing power indicator unit 14 may be adapted to store the established purchasing power indicator of the target customer in the memory unit 12.

In one embodiment, the purchasing data stored in the customer account associated with the target customer includes one or more of the following: average monthly spending at the retailer, average spending per visit at the retailer, spending history at the retailer, average number of category of goods shopped at the retailer, standard deviation of monthly spending at the retailer, and average monthly per category of goods spending. In another embodiment, the purchasing data stored in the customer account associated with the target customer includes at least: average monthly spending at the retailer, average spending per visit at the retailer, spending history at the retailer, average number of category of goods shopped at the retailer, standard deviation of monthly spending at the retailer, and average monthly per category of goods spending.

The indicator of the purchasing power of the target customer, or $X_{tc}$, is established as a function of each of the criteria included in the purchasing data.

In another aspect of the present invention, the memory unit 12 may be configured to store a purchasing power indicator for a plurality of other customers. The memory unit 12 may also be configured to store a credit score indicator for each of the plurality of other customers. The purchasing power indicators and credit score indicators associated with the plurality of other customers are used as a baseline for predicting the credit score of the target customer (see below). In one embodiment, the plurality of other customers includes only existing customers that have/use credit cards at the retail store.

In one embodiment, the memory unit 12 is configured to store purchasing data associated with each of the plurality of other customers of the retail store. The customer purchasing power indicator unit 14 may be further configured to establish a customer purchasing power indicator ($X_n$) for each of the plurality of other customers in a manner similar to the customer purchasing power indicator, Xtc, associated with the target customer (see below).

In one embodiment of the present invention, the credit score indicator of the plurality of other customers is based on the known FICO score of each of the plurality of other customers. In one embodiment, the credit score indicator is a normalized value of the customers' credit scores. For example, the credit scores may be normalized to a value between 0 and 1, [0,1].

In another embodiment, if the actual credit scores of the plurality of other customers are not known, as estimated credit score may be used.

In one embodiment, an estimated credit score may be determined using the formula:

$$T*cn,$$

where T is the respective customer's maximum monthly total credit card spending at the retailer, c is a predetermined constant, and n is a number of credit cards used by the respective customer at the retailer.

In another embodiment, the estimated credit score may be determined using the formula:

$$a1*M+a2*S+a3*H+a4*D+a5*n,$$

where, M is the maximum credit usage per month among all months, S is the past year average monthly spending with credit cards, H is the overall credit card spending history length in number of months, D is the standard deviation of the past year monthly credit cards spending, n is the total number of credit cards used, and a1-a5 are predetermined constants.

For purposes of the discussion below, the normalized credit score or the normalized estimated credit score is represented by $f_n$, where n represents one of the plurality of other customers.

The machine learning model unit 16 is coupled to the memory unit 12 and is configured to train a machine learning model as a function of the purchasing power indicator, $X_n$, and the credit score indicator, $f_n$, associated with each of the plurality of other customers. In one embodiment the training data for the machine learning model is formed as pairs ($X_n$, $f_n$), where n is a number between 1 and a predetermined number, e.g., 1,000,000.

In one embodiment, the machine learning model is one of a logistic regression model, a linear regression model, a smoothing splines model, a generalized additive model, and a regression tree model. In a further embodiment, the machine learning model unit 16 is further configured to be adapt the machine learning model as a function of past decisions.

The credit score prediction unit 18 is coupled to the memory unit 12 and the customer purchasing power indicator unit 14. Once the machine model has been trained on the test data by the machine learning model unit 16, the credit score prediction unit 18 is configured to establish a predicted credit score, $f_{tc}$, associated with the target customer as a function of the purchasing power indicator of the target customer, $X_{tc}$, and the machine learning model and to store the predicted credit score in the memory unit 12.

Once the predicted credit score has been established and stored in the memory unit 12, it may be used for a variety of purposes, including but not limited to:

- qualify the customer for a credit card or other financial product;
- overrule a denial of a credit card or other financial product;
- qualify the customer for purchasing finance, i.e., a cash loan;
- determine customer qualification for a financial promotion (e.g., 6 or 12 month interest free financing or cash back promotion);
- determine an annual percentage rate for a credit card or other financial product; and,
- determine a credit limit for a credit card or other financial product.

Figure 4:
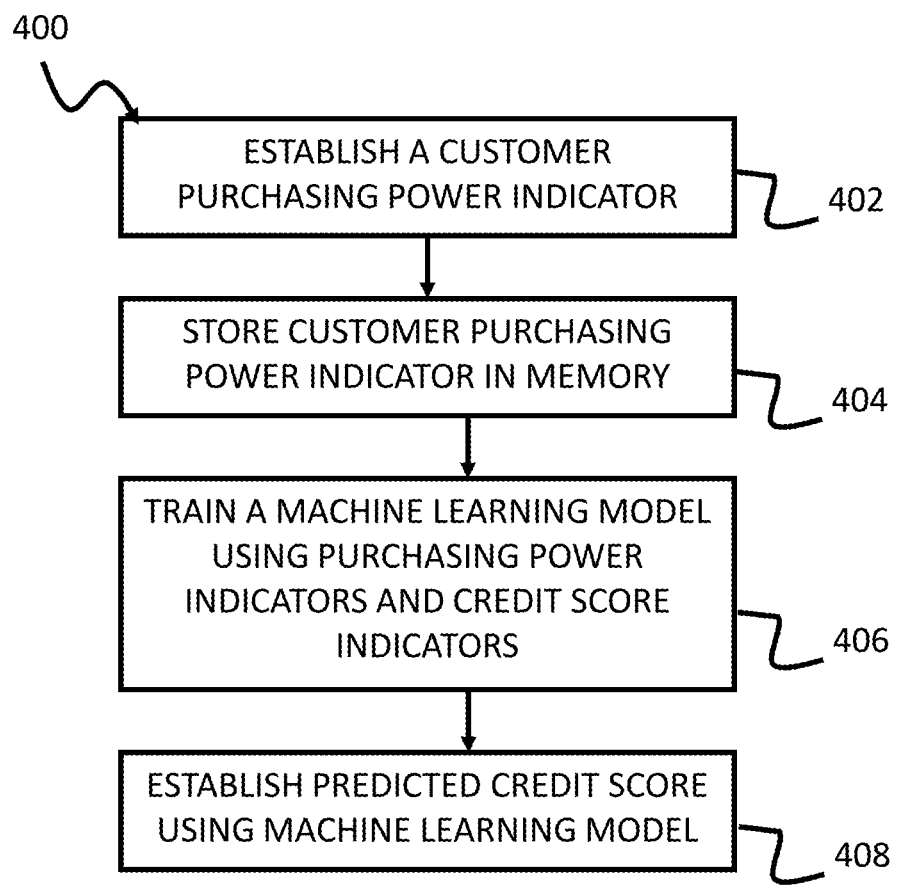
FIG. 4 is a flowchart of a method that may be used with the system shown in FIG. 1, according to an embodiment of the present invention; and, FIG. 5 is a flowchart of a second method that may be used with the system shown in FIG. 1, according to an other embodiment of the present invention.

FIG. 4 is a flowchart of a method 400 that may be used with the system 10 to establish a predicted credit score for a target customer.

In a first step 402, a (target) customer purchasing power indicator, Xtc, is established, as a function of the purchasing data stored in the associated customer account. The customer purchasing power indicated may be stored in the memory unit 12 in a second step 404. In the third step 406, a machine learning model is trained using test data, including purchasing power indicators and the credit score indicators associated with a plurality of other customers. In a fourth step 408, a predicted credit score associated with the target customer is established as a function of the purchasing power indicator of the target customer and the machine learning model.

In another aspect of the present invention, a system, method, and computer program product may be used to apply for a credit card for the target customer. In general, the process of applying for a credit card involve the steps of the customer filling out (on a paper form or electronic) a credit card application. The credit card application is then transmitted to the issuing authority, typically, a third party bank. The credit application typically includes information identifying the customer, e.g., name, address, social security number, . . . , and may include financial information, e.g., compensation and financial account information. The credit card application may be transmitted to the issuing authority electronically, from the customer's own electronic device or computer. Or the credit card application may be submitted by an employee of the retail store using a computer 100 or other device in the network, such as a terminal or a point of sale (POS) device. If the credit application is accepted, then the retail store may provide information regarding the new credit card account to the customer so that it may be utilized immediately. Alternatively, if the credit card application is initially denied, then the system 10, method and/or computer program product may submit a request that the application be reconsidered or that the denial be overridden (see below).

Returning to FIG. 4, in one embodiment of the present invention, the system 10 includes a credit estimation unit 28. The credit estimation unit 28 is coupled to the memory unit 12 and is configured to establish an estimate of a credit worthiness of the target customer as a function of the target customer's purchasing transactions stored in the memory unit 12.

In one embodiment, the credit worthiness includes a predicted credit score. As shown in FIG. 4, the credit estimation unit 28 may include the credit score prediction unit 18. In one embodiment, the credit score prediction unit 18 trains and uses a machine learning model using the purchasing history of a plurality of customers and the purchasing history of the target customer. Operation of the credit score prediction unit 18, according to one embodiment of the present invention is described above.

Alternatively, or in addition, the credit estimation unit 28 may also include a credit limit prediction unit 24. In one embodiment, the credit limit prediction unit 24 established a desired credit limit as a function of the target customer's monthly spending average over a predetermined period of time. In one embodiment, the desired credit limit (S) is determined using:

(Year_1_spending+Year_2_spending)/24 where, Year_1_spending is the total last year spending for the target customer and Year_2 spending is the total the year before last spending for the target customer.

The system 10 may also include a credit card application unit 26 coupled to the memory unit 12 and the credit estimation unit 28. The credit card application unit 26 is configured to receive information associated with the target customer and to transmit a credit card application to a bank computer system (not shown) as a function of the information associated with the target customer.

As discussed above, the target customer may fill in an online application or fill out a paper application. Generally, an employee of the retail store will fill out an electronic application based on the paper application received from the customer. The employee will then use the credit card application unit 28 to transmit the credit card application to the issuing authority, e.g., the issuing bank.

The credit card application unit 28 may then receive an answer or respond from the issuing authority. If the issuing authority approves the application, then an account is opened by the issuing authority and information related to the new account may be transmitted to the target customer by the employee.

Otherwise if the application has been denied, the credit card application unit 28 may further be configured to send one of (1) an request for consideration of the credit card application as a function of the purchasing power indicator associated with the target customer and (2) an override of the denial of the credit card application.

For instance, in one embodiment, the credit estimation unit 28 is used to establish a predicted credit score. The target customer's credit card application may have been denied because the target customer did not have a sufficient credit history to establish a FICO credit score or the customer's FICO credit score was too low. However, the retail store may desire that the target customer be issued a credit score on the basis of the predicted credit score. Therefore, the credit card application unit 26 may either override the issuing authority based on the predicted credit score or request that the decision be reversed based on the predicted credit score.

Alternatively, the credit card application unit 26 may decide to request that the denial be reversed or to override the decision based on the predicted credit limit.

Alternatively, both a predicted credit score and a predicted credit limit may be used to either override the denial of the application or to request reversal. In the latter instance, both the predicted credit score and the predicted credit limit may be transmitted to the issuing authority with the request.

Figure 5:
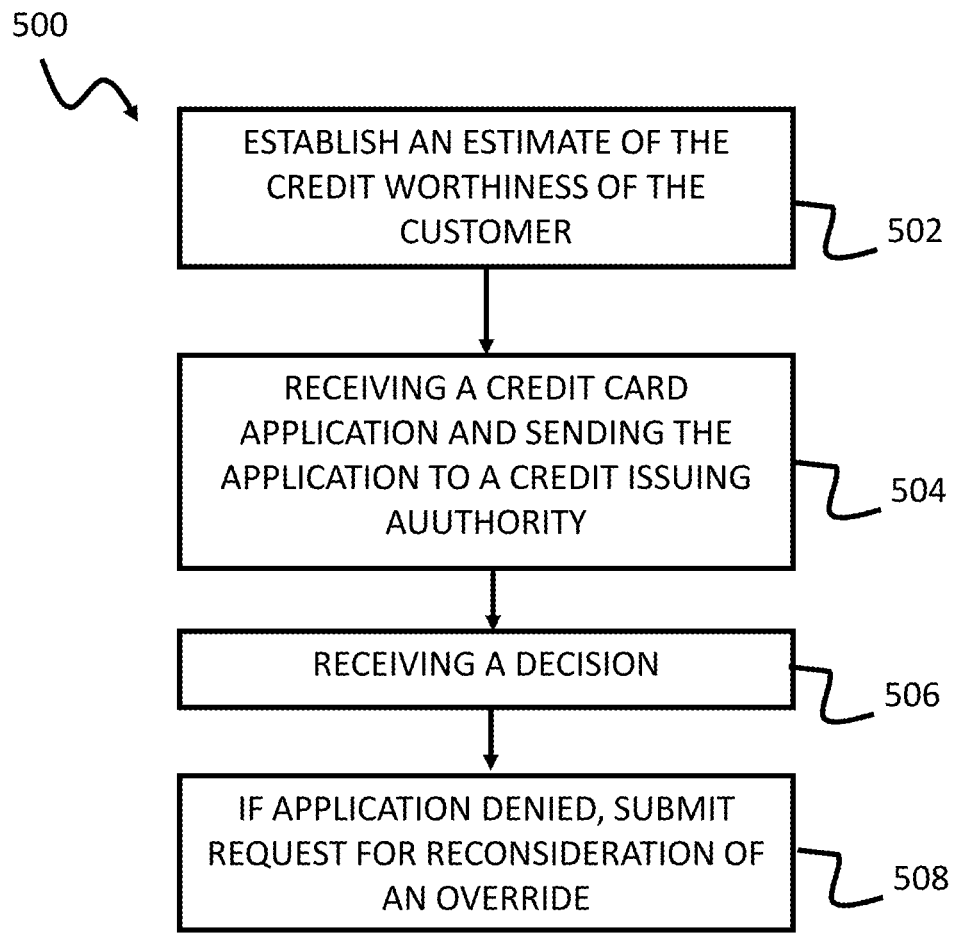

With reference to FIG. 5, a method 500 for allowing a target customer to apply for a credit card is shown. In a first step 502, an estimate of a credit worthiness of the target customer as a function of the target customer's purchasing transactions with the retailer is established. In a second step 504, a credit card application is received and sent to a credit issuing authority, e.g., an issuing bank. In a third step 506, a decision is received from the issuing authority. In a fourth step 508, if the credit card application is denied, then either a request for reconsideration or an override is sent to the issuing authority as a function of the estimate of the customer's credit worthiness. The customer's credit worthiness may be established using a predicted credit score and/or a predicted credit limit (see above).

In one embodiment of the present invention, the memory unit 12 includes one or more of the memory devices 104 and/or mass storage devices 108 of one or more of the computing devices 100. The units that comprise the invention are composed of a combination of hardware and software, i.e., the hardware as modified by the applicable software applications. In one embodiment, the units of the present invention are comprised of one of more of the components 102, 104, 106, 108, 110, 112, 130 of one or more of the computing devices (whether computer/network server 202A, 202b, 202C, computing asset 210a, 20b, or terminal 20ga, 206b, 206c), as modified by one or more software applications.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system for applying for a credit card for a target customer, comprising:

one or more processors; and memory storing one or more programs to be executed by the one or more processors, the one or more programs comprising instructions for:

receiving, by a server system, purchasing data comprising data from purchases by the target customer from one or more brick and mortar stores and one or more online stores of a retailer, the purchases comprising cash and debit card transactions from a customer account of the target customer, wherein the server system comprises a first processor, a first communication system, and a first memory system, wherein the server system further comprises a customer purchasing power indicator system, a credit estimation system, and a credit card application system;

storing and updating, by the first processor of the server system and in the first memory system of the server system, the purchasing data associated with the target customer;

establishing, using the customer purchasing power indicator system, a purchasing power indicator of the target customer as a function of the purchasing data, wherein the customer purchasing power indicator system comprises a second processor and a second communication system;

storing, by the second processor (a) of the customer purchasing power indicator system and (b) coupled to the first memory system, the purchasing power indicator of the target customer in the first memory system, the first memory system being further configured to store other purchasing power indicators and other credit score indicators for other customers based on credit card transactions of the other customers for purchases made by the other customers from the one or more brick and mortar stores and the one or more online stores of the retailer, the credit card transactions including other purchasing data of the other customers associated with other retail environments with a common nexus to the retailer;

training, by a machine learning model system, a machine learning model as a function of an other purchasing power indicator $X_n$ of the other purchasing power indicators and an other credit score indicator $f_n$ of the other credit score indicators associated with each of the other customers, wherein training data for the machine learning model is formed as pairs of the other purchase power indicator $X_n$ and the other credit score indicator $f_n$, where n is a number between 1 and a predetermined number;

determining, with a credit score prediction system, a predicted credit score of the target customer using the purchasing power indicator of the target customer and the machine learning model;

establishing, by a third processor (a) of the credit estimation system and (b) coupled to the first memory system, an estimate of a creditworthiness, via the predicted credit score, of the target customer as a function of the purchasing data of the target customer with the retailer stored in the first memory system and additional purchasing data of the target customer associated with the other retail environments with the common nexus to the retailer;

receiving, by the third processor (a) of the credit estimation system and (b) coupled to the credit card application system and (c) coupled to the first memory system, the predicted credit score and information associated with the target customer, wherein the credit card application system comprises a fourth processor and a fourth communication system;

submitting, by the fourth communication system of the credit card application system, the predicted credit score and the information associated with the target customer as part of an application for the credit card on behalf of the target customer to a credit issuing authority comprising a bank computer system, when the target customer does not have (a) a credit history greater than a minimum threshold level determined by the credit issuing authority, or (b) a FICO credit score greater than a minimum threshold level determined by the credit issuing authority;

receiving, by the fourth communication system (a) of the credit card application system and (b) coupled to the credit issuing authority, a decision from the credit issuing authority comprising an approval decision or a denial decision to issue the credit card to the target customer;

when (a) the approval decision is received from the credit issuing authority, by the fourth communication system of the credit card application system coupled to the credit issuing authority, and (b) the application was submitted to the credit issuing authority using a Point of Service (POS) terminal by a representative of the retailer, permitting the target customer to use the credit card at the POS terminal to purchase one or more products from the retailer upon receiving the approval decision and prior to issuance of the credit card to the target customer by the credit issuing authority; and when the denial decision is received from the credit issuing authority, by the fourth communication system of the credit card application system:

establishing a predicted credit limit as a function of an average monthly spending by the target customer at the one or more brick and mortar stores and the one or more online stores of the retailer over a pre-determined period of time based on the purchasing data and the additional purchasing data of the target customer; and re-submitting, by the fourth communication system (a) of the credit card application system, and (b) coupled to the credit issuing authority, a request for reconsideration of the application for the credit card based on the predicted credit limit of the target customer as the function of the average monthly spending by the target customer at the one or more brick and mortar stores and the one or more online stores of the retailer over the pre-determined period of time based on the purchasing data and the additional purchasing data of the target customer.

2. The system of claim 1, wherein the purchasing power indicator for the target customer further comprises ($X_{tc}$) as a function of the purchasing data.

3. The system of claim 2, wherein the predicted credit limit for the target customer is determined using:

$$(\text{Year\_1\_spending} + \text{Year\_2\_spending})/24,$$

wherein Year_1_spending is a total spending from last year for the target customer and Year_2_spending is a total spending from a year before last year for the target customer.

4. The system of claim 1, wherein the other credit score indicator of a respective customer of the other customers of a plurality of other customers is established using:

$$T*cn,$$

where T is a maximum monthly total credit card spending of the respective customer at the retailer, c is a predetermined constant, and n is a number of credit cards used by the respective customer at the retailer.

5. The system of claim 4, wherein the first memory system is further configured to store purchasing data associated with the each of the other customers of the plurality of other customers as a function of actual FICO scores of the plurality of other customers.

6. The system of claim 1, wherein the training data used to train the machine learning model further comprises an average monthly spending, an average spending per visit, an average number of categories of goods purchased, and a standard deviation of monthly spending of the other customers.

7. The system of claim 1, wherein the credit estimation system is configured to establish the predicted credit score associated with the target customer as a function of the purchasing data and the additional purchasing data of the target customer and the machine learning model and to store the predicted credit score in the first memory system, wherein the purchasing data and the additional purchasing data further comprise the average monthly spending, an average spending per visit, an average number of categories of goods purchased, and a standard deviation of monthly spending of the target customer.

8. The system of claim 1, wherein the machine learning model is one of a logistic regression model, a linear regression model, a smoothing splines model, a generalized additive model, or a regression tree model.

9. The system of claim 1, wherein the machine learning model system is further configured to adapt the machine learning model as a function of ($X_n$, $f_n$), wherein f represents a normalized credit score, where n represents the each of the other customers of a plurality of other customers.

10. A method for applying for a credit card for a target customer, comprising:

receiving, by a server system, purchasing data comprising data from purchases by the target customer from one or more brick and mortar stores and one or more online stores of a retailer, the purchases comprising cash and debit card transactions from a customer account of the target customer, wherein the server system comprises a first processor, a first communication system, and a first memory system, wherein the server system further comprises a customer purchasing power indicator system, a credit estimation system, and a credit card application system;

storing and updating, by the first processor of the server system and in the first memory system of the server system, the purchasing data associated with the target customer;

establishing, using the customer purchasing power indicator system, a purchasing power indicator of the target customer as a function of the purchasing data, wherein the customer purchasing power indicator system comprises a second processor and a second communication system;

storing, by the second processor (a) of the customer purchasing power indicator system and (b) coupled to the first memory system, the purchasing power indicator of the target customer in the first memory system, the first memory system being further configured to store other purchasing power indicators and other credit score indicators for other customers based on credit card transactions of the other customers for purchases made by the other customers from the one or more brick and mortar stores and the one or more online stores of the retailer including other purchasing data of the other customers associated with other retail environments with a common nexus to the retailer;

training, by a machine learning model system, a machine learning model as a function of an other purchasing power indicator $X_n$ of the other purchasing power indicators and an other credit score indicator $f_n$ of the other credit score indicators associated with each of the other customers, wherein training data for the machine learning model is formed as pairs of the other purchase power indicator and the other credit score indicator, where n is a number between 1 and a predetermined number;

determining, with a credit score prediction system, a predicted credit score of the target customer using the purchasing power indicator of the target customer;

establishing, by a third processor (a) of the credit estimation system and (b) coupled to the first memory system, an estimate of a creditworthiness, via the predicted credit score, of the target customer as a function of the purchasing data of the target customer with the retailer stored in the first memory system and additional purchasing data of the target customer associated with the other retail environments with the common nexus to the retailer;

receiving, by the third processor (a) of the credit estimation system and (b) coupled to the credit card application system and (c) coupled to the first memory system, the predicted credit score and information associated with the target customer, wherein the credit card application system comprises a fourth processor and a fourth communication system;

submitting, by the fourth communication system of the credit card application system, the predicted credit score and the information associated with the target customer as part of an application for the credit card on behalf of the target customer to a credit issuing authority comprising a bank computer system when the target customer does not have (a) a credit history greater than a minimum threshold level determined by the credit issuing authority, or (b) a FICO credit score greater than a minimum threshold level determined by the credit issuing authority;

receiving, by the fourth communication system (a) of the credit card application system, and (b) coupled to the credit issuing authority, a decision from the credit issuing authority comprising an approval decision or a denial decision to issue the credit card to the target customer;

when (a) the approval decision is received from the credit issuing authority, by the fourth communication system of the credit card application system coupled to the credit issuing authority, and (b) the application was submitted to the credit issuing authority using a Point of Service (POS) terminal by a representative of the retailer, permitting the target customer to use the credit card at the POS terminal upon receiving the approval decision and prior to issuance of the credit card to the target customer by the credit issuing authority; and when the denial decision is received from the credit issuing authority, by the fourth communication system of the credit card application system:
establishing a predicted credit limit as a function of average monthly spending by the target customer at the one or more brick and mortar stores and the one or more online stores of the retailer over a pre-determined period of time based on the purchasing data and the additional purchasing data of the target customer; and
re-submitting, by the fourth communication system (a) of the credit card application system, and (b) coupled to the credit issuing authority, a request for reconsideration of the application for the credit card based on the predicted credit limit of the target customer as the function of the average monthly spending by the target customer at the one or more brick and mortar stores and the one or more online stores of the retailer over the pre-determined period of time based on the purchasing data and the additional purchasing data of the target customer.

11. The method of claim 10, wherein the purchasing power indicator for the target customer further comprises ($X_{tc}$) as a function of the purchasing data.

12. The method of claim 11, wherein the predicted credit limit for the target customer is determined using:

$$(Year\_1\_spending + Year\_2\_spending)/24,$$

wherein Year_1_spending is a total spending from last year for the target customer and Year_2_spending is a total spending from a year before last year for the target customer.

13. The method of claim 10, wherein the other credit score indicator of a respective customer of the other customers of a plurality of other customers is established using:

$$T*cn,$$

where T is a maximum monthly total credit card spending of the respective customer at the retailer, c is a predetermined constant, and n is a number of credit cards used by the respective customer at the retailer.

14. The method of claim 13, wherein the first memory system purchasing data associated with each of the other customers of the plurality of other customers as a function of actual FICO scores of the plurality of other customers.

15. The method of claim 10, wherein the training data used in training the machine learning model further comprises an average monthly spending, an average spending per visit, an average number of category of goods purchased, and a standard deviation of monthly spending of the other customers.

16. The method of claim 10, wherein the predicted credit score is established as a function of the purchasing data of the target customer and the machine learning model.

17. The method of claim 10, wherein the machine learning model is one of a logistic regression model, a linear regression model, a smoothing splines model, a generalized additive model, or a regression tree model.

18. The method of claim 10, wherein the machine learning model system is further configured to adapt the machine learning model as a function of $(X_n, f_n)$, wherein f represents a normalized credit score, where n represents the each of the other customers of a plurality of other customers.

19. One or more non-transitory computer-readable storage media, having computer-executable instructions embodied thereon, wherein when executed by at least one processor, the computer-executable instructions cause the processor to comprise instructions for:
receiving, by a server system, purchasing data comprising data from purchases by a target customer from one or more brick and mortar stores and one or more online stores of a retailer, the purchases comprising cash and debit card transactions from a customer account of the target customer, wherein the server system comprises a first processor, a first communication system, and a first memory system, wherein the server system further comprises a customer purchasing power indicator system, a credit estimation system, and a credit card application system;
storing and updating, by the first processor of the server system and in the first memory system of the server system, the purchasing data associated with the target customer;
establishing, using the customer purchasing power indicator system, a purchasing power indicator of the target customer as a function of the purchasing data, wherein the customer purchasing power indicator system comprises a second processor and a second communication system;
storing, by the second processor (a) of the customer purchasing power indicator system and (b) coupled to the first memory system, the purchasing power indicator of the target customer in the first memory system, the first memory system being further configured to store other purchasing power indicators and other credit score indicators for other customers based on credit card transactions of the other customers for purchases made by the other customers from the one or more brick and mortar stores and the one or more online stores of the retailer including other purchasing data of the other customers associated with other retail environments with a common nexus to the retailer;
training, by a machine learning model system, a machine learning model as a function of an other purchasing power indicator $X_n$ of the other purchasing power indicators and an other credit score indicator $f_n$ of the other credit score indicators associated with each of the other customers, wherein training data for the machine learning model is formed as pairs of the other purchase power indicator and the other credit score indicator, where n is a number between 1 and a predetermined number;
determining with a credit score prediction system, a predicted credit score of the target customer using the purchasing power indicator of the target customer;
establishing, by a third processor (a) of the credit estimation system and (b) coupled to the first memory system, an estimate of a creditworthiness, via the predicted credit score, of the target customer as a function of the purchasing data of the target customer with the retailer stored in the first memory system and additional purchasing data of the target customer associated with the other retail environments with the common nexus to the retailer;
receiving, by the third processor (a) of the credit estimation system and (b) coupled to the credit card application system and (c) coupled to the first memory system, the predicted credit score and information associated with the target customer, wherein the credit card application system comprises a fourth processor and a fourth communication system;
submitting, by the fourth communication system of the credit card application system, the predicted credit score and the information associated with the target customer as part of an application for a credit card on behalf of the target customer to a credit issuing authority comprising a bank computer system, when the target customer does not have (a) a credit history greater than a minimum threshold level determined by the credit issuing authority, or (b) a FICO credit score greater than a minimum threshold level determined by the credit issuing authority;
receiving, by the fourth communication system (a) of the credit card application system and (b) coupled to the credit issuing authority, a decision from the credit issuing authority comprising an approval decision or a denial decision to issue the credit card to the target customer;
when (a) the approval decision is received from the credit issuing authority, by the fourth communication system of the credit card application system coupled to the credit issuing authority, and (b) the application was submitted to the credit issuing authority using a Point of Service (POS) terminal by a representative of the retailer, permitting the target customer to use the credit card at the POS terminal to purchase one or more products from the retailer upon receiving the approval decision and prior to issuance of the credit card to the target customer by the credit issuing authority; and
when the denial decision is received from the credit issuing authority, by the fourth communication system of the credit card application system:
establishing a predicted credit limit as a function of average monthly spending by the target customer at the one or more brick and mortar stores and the one or more online stores of the retailer over a predetermined period of time based on the purchasing data and the additional purchasing data of the target customer; and
re-submitting, by the fourth communication system (a) of the credit card application system, and (b) coupled to the credit issuing authority, a request for reconsideration of the application for the credit card based on the predicted credit limit of the target customer as the function of the average monthly spending by the target customer at the one or more brick and mortar stores and the one or more online stores of the retailer over the pre-determined period of time based on the purchasing data and the additional purchasing data of the target customer.

20. The one or more non-transitory computer-readable storage media of claim 19, wherein the other credit score indicator of a respective customer of the other customers of a plurality of other customers is established using:

$$T*cn,$$

where T is a maximum monthly total credit card spending of the respective customer at the retailer, c is a predetermined constant, and n is a number of credit cards used by the respective customer at the retailer.

\* \* \* \* \*